US006951013B1

(12) United States Patent
Lozins

(10) Patent No.: US 6,951,013 B1
(45) Date of Patent: Sep. 27, 2005

(54) METHOD FOR FACILITATING DEVELOPMENT AND TESTING OF RELATIONAL DATABASE APPLICATION SOFTWARE

(76) Inventor: Neal N. Lozins, 111 Chestnut St., #908, San Francisco, CA (US) 94111

( * ) Notice: Subject to any disclaimer, the term of this patent is extended or adjusted under 35 U.S.C. 154(b) by 504 days.

(21) Appl. No.: 10/086,271

(22) Filed: Mar. 1, 2002

(51) Int. Cl.[7] .............................................. G06F 9/44
(52) U.S. Cl. ..................................... 717/125; 717/113
(58) Field of Search ............................... 717/100–103, 717/106–117, 124–127; 707/100–102, 201–202

(56) References Cited

U.S. PATENT DOCUMENTS 6,546,395 B1 * 4/2003 DeKimpe et al. ........... 707/101

OTHER PUBLICATIONS

Bunch, "Fundamental Microsoft Jet SQL for Access 2000", Microsoft Corporation, pp. 1-15, Feb. 2000.*
Hoffman, "Introduction to Structured Query Language", http://w3.one.net , Version 4.66, pp. 1-32, Apr. 2001.*
Hoffman, "Introduction to Structured Query Language", http://www.intermedia.net , Version 4.11, pp. 1-19, Nov. 1998.*

"Maximizing DB2 Application Testing . . . a new approach with DB2 Slice/Plus," literature available at CA world Conference, New Orleans, LA, Apr. 9-14, 2000.
"DB2 Slice/Plus," literature available at CA world Conference, New Orleans, LA, Apr. 9-14, 2000.

* cited by examiner

Primary Examiner—Ted T. Vo
(74) Attorney, Agent, or Firm—Carter Schnedler & Monteith, P.A.

(57) ABSTRACT

A method for allowing individual user entities access to tables in a database, such as a DB2 database, in an isolated manner, that is, without interfering with each other. For each original database table, DDL statements are employed to create a new table. Within the new table are defined the same columns that are defined in the original database table, as well as an additional column that includes a User Identification. A view is created having the same name and column definitions as the original database table, where the view selects only the rows in the new table in which the User Identification matches a particular user entity. For each particular user entity, access is allowed to the view for executing DML statements of the application program without modification of the DML statements of the application program other than for purposes of developing and testing functionality of the application program.

4 Claims, 2 Drawing Sheets

METHOD FOR FACILITATING DEVELOPMENT AND TESTING OF RELATIONAL DATABASE APPLICATION SOFTWARE

BACKGROUND OF THE INVENTION

The invention relates generally to relational database application software development and testing and, more particularly, to a method for allowing individual user entities (e.g. individual users or user groups) access to tables in the database in an isolated manner, that is, without interfering with each other.

Databases are computerized information storage and retrieval systems that are essential for the operations of many businesses. A database manager, also known as a database management system (DBMS), is a complex and sophisticated computer program that provides a variety of tools for defining, manipulating data in, controlling access to and otherwise managing the database in a variety of ways. A relational database management system (RDBMS) uses relational techniques for storing and retrieving data organized into tables which consist (conceptually) of rows and columns of data. The manner in which data is physically stored in the database is handled by the database manager, and is not the concern of the user.

In the context of the invention, a relevant function of the database manager is executing the programming statements (program code) of an application program written in a language such as SQL (Structured Query Language). SQL is used for three kinds of operations, which have their own respective subsets of SQL. Thus, data manipulation operations are directed by Data Manipulation Language (DML) statements, and include data retrieval and data modification. Data definition operations are directed by Data Definition Language (DDL) statements, and include creating and removing objects such as tables, indexes and views. Data administration or control operations are directed by Data Control Language (DCL) statements and allow a database administrator to maintain and coordinate use of the database, including granting authorities or privileges to user entities to access database objects in specific ways. In addition, there is Job Control Language (JCL) which is used to identify a job to the operating system and to describe requirements of the job.

A database typically has many tables, sometimes numbering in the hundreds, and each table typically has multiple rows and multiple columns. Within each table, there usually is something that uniquely identifies each row, and that something is known as the primary key. If employed, a primary key is defined (as a matter of database design and as part of the table definition) as the column or combination of columns that distinguishes a particular row from all others.

In addition to user tables, that is, tables created by users to contain user data, a database contains a variety of system tables, whose function is to hold certain data that the database manager itself needs in order to manage the database. The system tables are collectively referred to as the database catalog.

A particular relational database management system in combination with which the invention may be employed is known as DB2, a product of International Business Machines Corporation (IBM). DB2 runs on mainframe computers under operating systems such as OS/390, and versions are also available for various personal computer operating systems. The invention, however, is not in any way limited to use in combination with DB2, and may, for example, be employed in combination with other relational database management systems such as Oracle, Sybase, Informix and SQL Server.

A database can be very complex, involving, as noted above, hundreds of tables, and requiring a large data storage capacity when "live," for example, several terabytes. (A terabyte is a trillion bytes.)

Developing, testing and maintaining a relational database application program typically requires a team effort, involving many individual application programmers (also known as "users" in the context of the development environment) or groups of individual application programmers or users. The terminology "user entity" is employed herein to refer to both individual users and groups of users. Providing an application development and testing environment in which a plurality of user entities access the database, as a practical matter, presents a number of challenging demands, if conflicts are to be avoided. Each stage of the testing process has varying degrees of complexities and demands on coordinating testing efforts.

As a simple example, through DML program statements, during development and testing one user entity may be uploading data to a table, another user entity may be deleting data from the same table, while a third user entity is attempting to test a program that accesses the table. Clearly there are conflicts.

As more general examples, during unit testing, tests are performed on individual program modules to determine if they meet defined specifications. Individuals working alone, typically a programmer, usually perform unit tests. A very limited amount of coordination is necessary for unit testing. String testing advances the process with a series of program modules to confirm that they communicate necessary information between each other. Then the testing process advances to the system level. At various stages, application program modifications are made and regression testing is required to revalidate results. There are additional kinds of testing such as performance, stress, production simulation, and parallel production testing done prior to implementation of an application.

There are a number of demands specific to various stages of testing. In the context of the invention, it can be difficult to keep track of the test data necessary to repeat the tests and re-establish the test data, especially when tests require isolation or a predefined order to the testing schedule.

As another example, different program modules serve different functions and may need to be isolated or scheduled. Examples are purge programs, report programs, and update programs. Testing a report program while testing the update program may produce unpredictable results. Was the reason the reports were wrong due to errors in the report program or just the fact that the update program changed the data before it was reported? Was the reason the update program failed because the purge program removed the data before it could be updated? These can be time consuming and frustrating questions to answer.

In real-world projects, different components of the system are typically in different stages of testing. For example, some program modules might still be in unit test while others are in string test. Allowing more than one group of testers to perform these tests in the same environment on shared data is neither practical nor advised. Different test activities can adversely affect one another. Testing in this way is very error-prone and requires extensive coordination activity that slows project progress and can impede, if not prevent, parallel testing.

Individual unit tests also have the problem of determining whether the program functioned as expected. Reports and screens are fairly easy to verify, but did the data stored go through the expected transformation? Did the employee given the 10% raise have his salary updated by the correct amount in the data store? Was some other employee attribute accidentally updated at the same time?

Using a database management system like DB2 can pose additional demands. The very facilities that guarantee production data integrity make testing more difficult. Thus, the DB2 database manager uses a lock mechanism to ensure that users reading information get accurate data and that only one user can update at a time. For example, assuming a locksize of page is chosen, if two testers (user entities) have data that happens to be on the same page, they could prevent each other from testing. To make matters worse, locks are not released until commit. On-line debugging facilities can hold locks for hours, preventing one or more tests from being able to execute.

The DB2 database manager has a load utility which is often used to re-establish test data. There also are third-party replacements for the DB2 load utility. These loads have to be done table by table and Job Control Language statements developed to accomplish the task. Moreover, while the load utility is executing, the tables are unavailable for other testing work. After loads are done, tablespaces may require image copies or additional utility operations such as the check data utility to make the data available again.

Referential integrity constraints can cause additional consideration as to how the data is saved and loaded, or even which tables are required for testing. Although these constraints are beneficial to the integrity of the application, they will require data in other tables, and consideration in the data loading for test purposes.

There are a number of conventional solutions to these demands, each having its own drawbacks. Conventional solutions generally involve (1) scheduling, (2) creating additional environments (multiple copies of the same tables), (3) various combinations of the above, or (4) modifying program code and adding additional column(s) to tables.

Simply scheduling testing is by far the easiest solution. Thus, Monday is the report program, Tuesday is the update program, Wednesday is the Purge program, etc. Monday is string test #1; Tuesday is string test #2. Monday is system test #1 and Tuesday is regression test #1. The problem is time; given enough time, scheduling would be an easy solution to the problems described above.

A hybrid approach is combining scheduling with key assignment. If key values are assigned to various test processes, at least some testing can occur in parallel. As an example, the report program test uses employees 100 through 200. The purge program uses employees 200 through 300, etc. But, what about the department table? It is keyed by department number. All employees in the 100 through 200 ranges must be assigned to departments 10 through 20 and employees in the 200 through 300 ranges must be assigned to departments 20 through 30. Drawbacks here are that each additional key must be assigned a range for each test group and the relationships propagated properly. Even so, errors can occur in programs that will occasionally cause updates to data that is not intended. DB2 lock contention can still happen in spite of careful choices of key assignments.

Providing multiple environments is sure way to avoid lock contention. Each user entity is given a set of tables. This avoids DB2 load and lock contention problems entirely, but it can be an expensive alternative. It is not unusual for an application environment with 400 "live" tables to grow or perhaps explode to more than 8000 test and development tables. Even with the availability of DB2 alter and migrate tools, this alternative becomes very time consuming for database administrators (humans). Application program modules each have to be bound properly, using the correct DB2 table creator. The same program module can be bound many times in such an environment. If there is a common module that is used in many functions and a change is made to it, the module will have to be bound numerous times and tested everywhere. Another risk of this solution is not properly making a table change to all environments. This could result in application program code being developed against an outdated table definition. In general, when multiple environments are provided, a lot of coordination is required for database changes. The more environments, the more coordination is required.

A variation of using multiple copies of tables is to provide multiple DB2 subsystems. Although this variation is an even more expensive solution, an advantage is that DB2 creators (sometimes referred to as owner) do not have to be changed.

Another approach is modifying program code and adding additional column(s) to tables. As an example, a pre-processor may be employed that reads program source code and adds a WHERE clause to each SQL query to point at a specific data value supplied at execution time. This minimizes the number of environments and usually solves lock contention problems. Unfortunately, it requires modification of application program source code, and these modifications can be quite extensive. It additionally requires that several coding conventions be adopted to set the additional columns properly when a statement to INSERT a row is executed. Pre-processors have to be written and executed to add the WHERE clauses to the SQL source code. When SQL syntax changes are made, changes to the pre-processor have to be made to recognize the new syntax.

A related prior art approach is to create a set of test and development tables corresponding to the "live" database tables. Within each test and development table the same columns are defined as in the original database Table. Another column is added to each test and development table, defined to include a value that is unique for each tester or group of testers (user entity), and also made part of the primary key of the table. In addition, a view is created having the same name and column definitions as the corresponding "live" database table, where the view selects only the rows in the test and development table in which the unique value matches a particular user entity. This gives each user entity its own view, or slice, of the table, which is accessed using application program DML statements. Each slice is completely isolated from the activities of other testers. While an improvement to other prior art approaches, this particular approach still has drawbacks. In particular, the column added to each test and development table is part of the primary key, and therefore must be present. However, the added column is omitted from the view. As a result of this omission, a Data Manipulation Language statement to INSERT a row and accessing only the view would not store a value in the added column of the test and development table. Accordingly, a pre-processor is still required, although not as extensive a pre-processor as in other prior art approaches, to modify the INSERT statements of the application program being developed or tested so as to reference the test and development table for storing a value in the added column which requires a value to be present. Moreover, when development and testing are completed, a pre-processor must again be run to remove the modifications to the INSERT statements of the application program in order to correctly access the corresponding "live" database table.

SUMMARY OF THE INVENTION

An exemplary embodiment of the invention provides a method for facilitating the development and testing, by a plurality of individual user entities, of a relational database application program which includes a plurality of Data Manipulation Language statements, which runs under a database management system and which accesses original database tables organized as rows of defined columns. For each original database table, Data Definition Language statements are employed at least a first time to create a corresponding new table. Within the new table are defined the same columns that are defined in the original database table. The new table includes an additional column that is defined to include a User Identification. For each original database table, Data Definition Language statements are also employed at least a first time to define a view created having the same name and column definitions as the corresponding original database table, where the view selects only the rows in the new table in which the User Identification matches a particular user entity. For each particular user entity, access is allowed to the view (created by a match of the User Identification with the particular user entity) for executing Data Manipulation Language statements of the application program, including statements to insert rows, without modification of the statements of the application program other than for purposes of developing and testing functionality of the application program.

Embodiments of the invention accordingly address the need for test case isolation, while avoiding the considerable problems with the common methods of providing this isolation.

DETAILED DESCRIPTION

Figure 1:
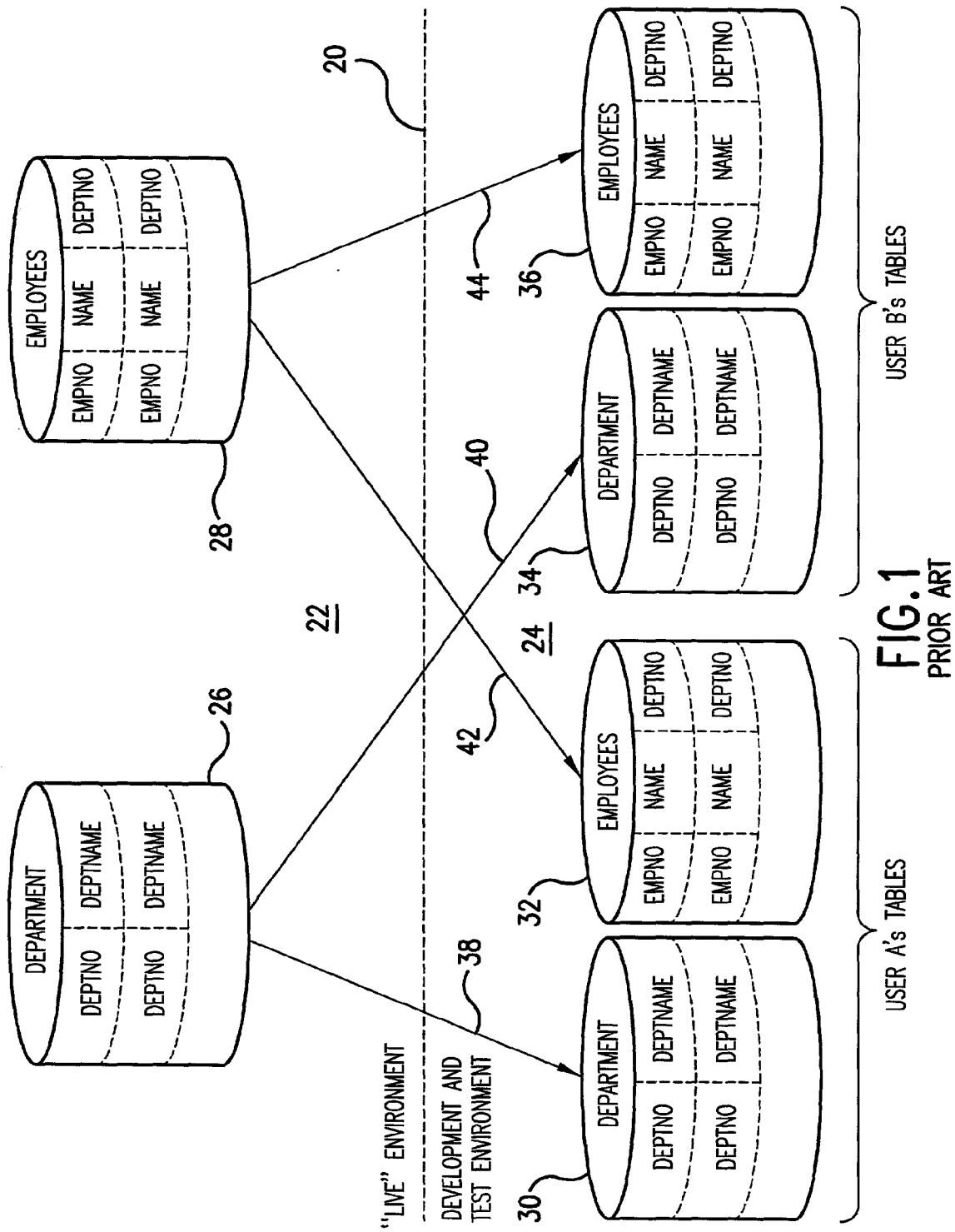
FIG. 1 is a representation of the prior art approach of providing multiple development and testing environments, giving each user entity is given an identical set of test and development tables.

FIG. 1 is a simplified representation of the prior art approach of giving each user entity its own set of tables, in other words, providing multiple environments. In FIG. 1, a horizontal dash line 20 conceptually separates a "live" or production environment 22 above from a test and development environment 24 below. Within the live or production environment 22 are live database tables, and within the test and development environment 24 are test and development tables used only for development and testing, and not necessarily containing real data. (However, it is quite possible to have a system in development that has no corresponding tables in production, in other words, no live tables.)

Within the live or production environment 22 of FIG. 1 are two representative tables 26 and 28 of a relational database. It will be appreciated that this is an extremely trivial example, and that a relational database application may very well have hundreds of tables. Table 26 is defined as a table named DEPARTMENT in which the rows have two columns defined as DEPTNO and DEPTNAME, where DEPTNO is the primary key. Table 28 is defined as a table named EMPLOYEES in which the rows have three columns, defined as EMPNO, NAME and DEPTNO. EMPNO is the primary key, and DEPTNO is a foreign key (from the Department table 26).

The following EXAMPLE 1 is exemplary SQL, more particularly Data Definition Language (DDL) statements, for this prior art approach.

EXAMPLE 1

```
CREATE TABLE TS3EMP.DEPARTMENT
    (DEPTNO        CHAR(3)      NOT NULL
    ,DEPTNANE      VARCHAR (38) NOT NULL
    ,MGRNO         CHAR (6)
    ,ADMRDEPT      CHAR (3)     NOT NULL
    ,LOCATION      CHAR (16)
    ,PRIMARY KEY (DEPTNO) )
    IN TDBEMP01.S01
    CCSID EBCDIC;
CREATE UNIQUE INDEX TS3EMP.XDEPT1
    ON TS3EMP.DEPARTMENT
    (DEPTNO    ASC)
    USING STOGROUP TEMPIX01
            PRIQTY 12
            ERASE NO
            CLUSTER
        BUFFERPOOL BP0
            CLOSE NO;
```

In the foregoing EXAMPLE 1, the DEPARTMENT table created, unlike the simplified example of FIG. 1, actually has five columns defined, namely, DEPTNO, DEPTNAME, MGRNO, ADMRDEPT and LOCATION. The primary key is based on the DEPTNO column only. Also, the creator TS3EMP is specified. (Table names are unique by their creator (sometimes referred to as owner) and their name. (The name before the dot is the creator and the name after the dot is the name of the table.) Usually, but not always, the creator is used for multiple versions of the same table. So, in a development and test environment, one could have for example one hundred invoice tables all named INVOICE but with different creators. In places where users can create their own tables the creator is often the userid or current sqlid.)

Referring again to FIG. 1, in setting up the development and test environment 24, the database administrator, using appropriate commands and utilities, copies into the development and testing environment 24 the DEPARTMENT and EMPLOYEES tables 26 and 28 for each user entity. (Copying the tables means copying the table definitions, not necessarily all of the data in the tables 26 and 28.)

In the FIG. 1 example, the table copies for user "A" are designated 30 and 32, while the table copies for user "B" are designated 34 and 36. Arrows 38, 40, 42 and 44 represent the copying operation. Although two user entities are represented in this example, user "A" and user "B," in a real world example there may be twenty or more user entities (e.g. individual users or user groups).

The database administrator, again using appropriate commands, gives user "A" authorization to access tables 30 and 32, and gives user "B" authorization to access tables 34 and 36. The database administrator might also load appropriate test data into the test and development tables 30, 32 and 34, 36, using the utilities such as the DB2 load utility. Other than the different creators and authorizations, the definitions of the tables 34 and 36 are identical to the definitions of the tables 30 and 32. In this environment, user "A" accesses tables 30 and 32 for development and test purposes, and user "B" accesses tables 34 and 36 for development and test purposes. There is no conflict, such as lock contention, between the two users. Each user can develop and test DML statements of the application program, accessing the tables in the development and test environment 24 by the same names as the tables in the live or production environment 22.

However, and as noted briefly above in the "Background", the approach of FIG. 1 becomes very time consuming for database administrators. If, for example, there is a change in a table definition, all of the copies in the test and development environment 24 must be updated. The approach of FIG. 1 also can unduly consume system resources. It is not unusual for an application environment with 400 live tables to grow to more than 8000 test and development tables.

Figure 2:
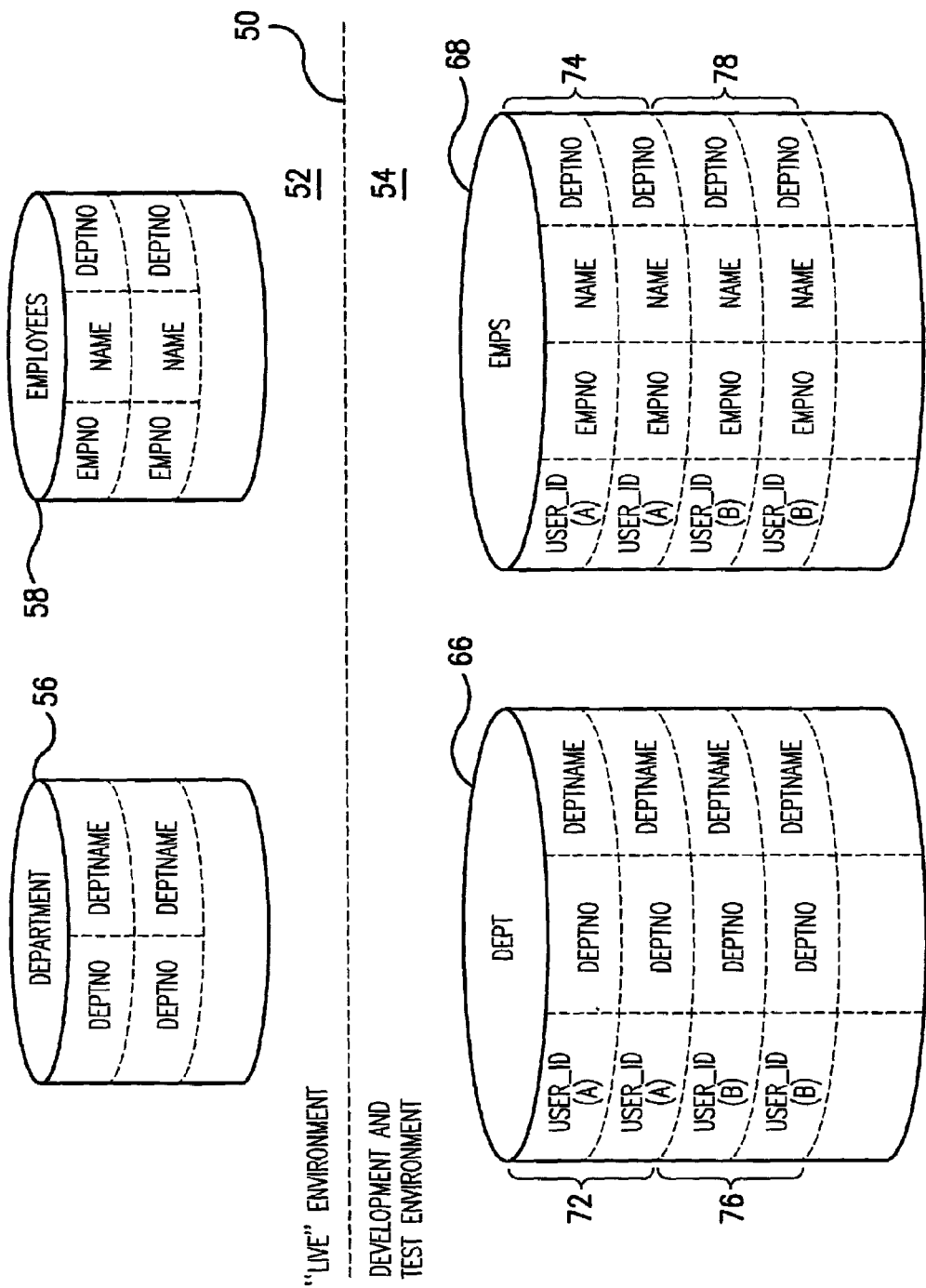
FIG. 2 is a representation of an embodiment of the invention wherein one set of test and development tables is made, and each user entity is given access to a slice of the test and development tables independent of other user entities.

FIG. 2 represents a method embodying the invention. In FIG. 2, a dash line 50 separates a live or production environment 52 above from a test and development environment 54 below. (Again, it is possible to have a system in development that has no live tables in production.)

In FIG. 2, tables 56 and 58 are production tables identical to the DEPARTMENT and EMPLOYEES tables 26 and 28 of FIG. 1. Or, if not actual live or production tables, the tables 56 and 58 have the same table definitions as intended actual live or production tables, and accordingly are herein also referred to as "original" database tables.

The database administrator, again employing appropriate Data Definition Language (DDL) statements, for each of the original database tables 56 and 58, creates within the test and development environment 54 a corresponding new table (and only one corresponding new table for each original table). The new tables do not have the same names as the original tables, but preferably names similar enough to be recognized as corresponding. In the example of FIG. 2, new tables 66 and 68 are created, respectively named DEPT and EMPS. Each of the new tables 66 and 68 has defined within it the same columns that are defined in the original database table 56 or 58. Thus, new database table 66 named DEPT has defined within it DEPTNO and DEPTNAME columns, the same as the original database table 56. Likewise, new database table 68 named EMPS has defined within it three columns, EMPNO, NAME and DEPTNO, the same as original table 58. In addition, each of the new tables 66 and 68 includes an additional column defined to include a user identification. In this example, the additional column is named USER_ID. This additional column is also included as part of the primary key. Thus, the primary key for the new DEPT table 66 in the development and test environment 54 combines the USER_ID and DEPTNO columns, and the primary key for the new EMPS table 68 in the development and test environment 54 combines the USER_ID and EMPNO columns.

In addition, the database administrator, again employing data definition language (DDL) statements, for each of the original database tables 56 and 58, defines a view to be created having the same name and column definitions as the corresponding original database table, where the view selects only the rows of the new table in which the user identification matches a particular user entity. In the context of database management systems, a view is a frame through which only particular data that is of concern is seen. A view is derived from one or more "real" tables, that is, tables that are actually stored in the database, also known as base tables. In many respects, a view looks and behaves like an ordinary database table, but it is in fact a virtual, derived construct. A view can be displayed and operated on in the same manner as a base table. Details regarding a view are maintained in the database catalog as a system function.

As each row of data is subsequently stored in either of the new tables 66 or 68, the value stored in the USER_ID column is a User Identification corresponding to a particular user entity. As a result each user entity, through the view, has exclusive access to a particular "slice" of data in the new database tables 66 and 68, and yet all users share the same new database tables 66 and 68. Thus, user "A" has access to slices 70 and 72 of the new database tables 66 and 68, and user "B" has access to slices 74 and 76 of the new database tables 66 and 68.

The following EXAMPLE 2 is exemplary SQL, more particularly Data Definition Language (DDL) statements, for an approach embodying the invention:

EXAMPLE 2

```
CREATE TABLE TS3EMP.DEPT
    (DEPTNO          CHAR (3)       NOT NULL
    ,SQL_USER        CHAR (08)      NOT NULL WITH
                                    DEFAULT CURRENT SQLID
    ,DEPTNAME        VARCHAR (36)   NOT NULL
    ,MGRNO           CHAR (6)
    ,ADMRDEPT        CHAR (3)       NOT NULL
    ,LOCATION        CHAR (16)
    ,PRIMARY KEY (SQL_USER,DEPTNO) )
    IN TDBEMP01.S01
    CCSID EBCDIC;
CREATE UNIQUE INDEX TS3EMP.XDEPT1
    ON TS3EMP.DEPT
    (SQL_USER, DEPTNO ASC)
    USING STOGROUP TEMPIX01
                PRIQTY 12
                ERASE NO
                CLUSTER
            BUFFERPOOL BP0
                CLOSE NO;
COMMENT ON TABLE TS3EMP.DEPT IS 'DEPARTMENT';
CREATE VIEW TS3EMP.DEPARTMENT
 (DEPTNO
 ,DEPTNAME
 ,MGRNO
 ,ADMRDEPT
 ,LOCATION
 ) AS SELECT
 DEPTNO
 ,DEPTNAME
 ,MGRNO
 ,ADMRDEPT
 ,LOCATION
 FROM TS3EMP.DEPT
 WHERE SQL_USER = CURRENT SQLID
 WITH CHECK OPTION;
```

In the foregoing EXAMPLE 2, the new DEPT database table created, unlike the simplified example of FIG. 2, actually has six columns defined, namely, DEPTNO, SQL_USER, DEPTNAME, MGRNO, ADMRDEPT and LOCATION. Thus, compared to the prior art example of EXAMPLE 1, there is an additional column named SQL_USER. The primary key is based on a combination of the SQL_USER and DEPTNO columns. The same creator TS3EMP is specified as in the prior art example of EXAMPLE 1, above. In addition, the indexes for the new table and the keys for the new table include the added column SQL_USER as the lead column. Thus, since there must exist an index to support a primary key, it becomes important as to where the added column goes in the primary key definition. The reason the added column is important for the index is that the index provides an access path to the data. Since the value of this added column is always known in a sliced environment during execution, knowing its value and having it as part of the index as the lead column points the database manager more directly to the data for the slice accessed by a particular user entity.

The "added" column is named SQL_USER and is defined to the table as NOT NULL WITH DEFAULT CURRENT SQLID. For other DB2 platforms, the definition would be NOT NULL WITH DEFAULT CURRENT USER. The "NOT NULL" portion of this definition means that information must be provided in the column. The "WITH DEFAULT CURRENT SQLID" (or, for other platforms, "WITH DEFAULT CURRENT USER") portion of this definition specifies the default value for the column. CURRENT SQLID is a special register maintained by the database management system, and the stored value specifies the SQL authorization ID of a process. The initial value of CURRENT SQLID can be provided by the connection or sign-on exit routine. If not, the initial value is the primary authorization ID of the process. In any event, the system will have a value for CURRENT SQLID for each user entity that logs on, and that value of CURRENT SQLID will be unique to that particular user entity.

The CREATE VIEW statement of the foregoing EXAMPLE 2 includes the clause "WHERE SQL_USER=CURRENT SQLID." This "WHERE" clause specifies the criteria that a row of the new database table (e.g. table 66 or 68 of FIG. 2) must meet in order to be included in the view. In this case the "WHERE" clause specifies that the value stored in the SQL_USER column match the value stored in the CURRENT SQLID register.

The WITH CHECK OPTION statement ensures that a user entity accessing the view does not inadvertently insert a row that does not belong to the user entity.

The view defined in EXAMPLE 2 looks like the original database table for reference during development and testing. In other words, it has the same name (TS3EMP.DEPARTMENT), as well as the same columns in the same order. The value of CURRENT SQLID is resolved at execution time. Access to this view looks and feels like access to the old base table from which it is derived as guaranteed by the database management system, in this example DB2. Each user can develop and test DML statements of the application program, accessing the views in the development and test environment 54 by the same names as the tables in the live or production environment 52. For each particular user entity, at execution time the system allows access to the view created by a match of the User Identification with the particular user entity for executing Data Manipulation Language statements of the application program, including statements to insert rows, without modification of the statements of the application program other than for purposes of developing and testing functionality of the application program.

The COMMENT statement places an entry in the remarks column of a catalog table sysibm.systables maintained by the database manager, for use by utilities that may be developed which require an association of the new table and the view. There is one row of the catalog table sysibm.systables table for each base table and one row for each view. The COMMENT statement as coded puts the association on the base table row.

As described above in the Background, since the added SQL_USER column of the new database table is omitted from the view derived therefrom, there is a problem when the application program under development includes a Data Manipulation Language statement to INSERT a row. Accessing only the view would not store a value in the added column of the new database table. Embodiments of the invention, by defining the default for SQL_USER as CURRENT SQLID, take advantage of a DB2 system function whereby, when an INSERT command is executed, the value from the CURRENT SQLID register is automatically stored in the SQL_USER column.

To summarize, the database management system creates an authorization identification for each user entity logging on. During the step of employing Data Definition Language statements to create a corresponding new table, the additional column is defined as NOT NULL and to contain the authorization identification as a default value. Subsequently, when a statement to INSERT a row accesses a view derived from a table, the database management system stores defined default values in any columns of the row which are present in the table from which the view is derived but which are missing from the view.

When development and testing employing Data Manipulation Language statements of the application program have reached a desired stage of completion, the application program is ready for execution against the live or production database tables, e.g. the original database tables 56 and 58, there are two approaches that may be taken, depending upon the preference of the database administrator.

As a first approach, for each original database table, the Data Definition Language (DDL) statements which created the corresponding new table and defined the view having the same name and column definitions as the corresponding original database table are simply removed. In other words, the Data Definition Language (DDL) code is returned to its original condition. As a result, that the application program can access all rows of the original database table without modification of the Data Manipulation Language statements of the application program.

As a second approach, for each original database table, the Data Definition Language (DDL) statements which created the corresponding new table and defined the view having the same name and column definitions as the corresponding original database table are modified by removing all reference to the User Identification such that access to the view is not limited to rows in the new Table where the User Identification matches a particular user entity. As a result, the application program can access through the view all rows of the original database table without modification of the Data Manipulation Language statements of the application program.

EXAMPLE 3 below is a specific example of DDL program code to implement the second approach. The code EXAMPLE 3 is similar to that of EXAMPLE 2, but with all references to SQL_USER removed.

EXAMPLE 3

```
CREATE TABLE TS3EMP.DEPT
    (DEPTNO      CHAR (3)        NOT NULL
    ,DEPTNAME    VARCHAR (36)    NOT NULL
    ,MGRNO       CHAR (6)
    ,ADMRDEPT    CHAR (3)        NOT NULL
```

```
                -continued

,LOCATION      CHAR (16)
          ,PRIMARY KEY (DEPTNO) )
          IN TDBEMP01.S01
          CCSID EBCDIC;
       CREATE UNIQUE INDEX TS3EMP.XDEPT1
          ON TS3EMP.DEPT
          (DEPTNO ASC)
          USING STOGROUP TEMPIX01
                         PRIQTY 12
                         ERASE NO
                         CLUSTER
                         BUFFERPOOL BP0
                         CLOSE NO;
       CREATE VIEW TS3EMP.DEPARTMENT
          (DEPTNO
          ,DEPTNANE
          ,MGRNO
          ,ADMRDEPT
          ,LOCATION
          ) AS SELECT
          DEPTNO
          ,DEPTNANE
          ,MGRNO
          ,ADMRDEPT
          ,LOCATION
          FROM TS3EMP.DEPT;
```

With either the first or second approach, an application program (using DML) developed using the view is guaranteed to work the same when applied to the original database tables. Modification of program source code is not required.

In view of the foregoing, it will be appreciated that, during development and testing of a database application program by a plurality of individual user entities, each slice is completely isolated from the activities of other user entities, and this isolation is achieved without modification of DML program code. Users can share or isolate unit test data within a single set of DB2 tables, such that each user entity can have one or more "slices" of its own test data, each tailored to provide repeatable tests for its particular program or programs. Multiple string tests that can be executed concurrently. Concurrent system testing is facilitated, normally performed in units called phases or artificial "test days". Each phase or test day builds upon the previous. Normally, system testing is linear: Day 1 testing must be completed before day 2 testing can begin. Day 2 must be completed before day 3 can begin, etc. Employing embodiments of the invention, not only can day 1 testing be performed concurrently with day 2 testing, but it can also be performed within the same set of DB2 tables.

While the novel features of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A method for facilitating the development and testing, by a plurality of individual user entities, of a relational database application program which includes a plurality of Data Manipulation Language statements, which runs under a database management system and which accesses original database tables organized as rows of defined columns, said method comprising, for each original database table:

employing Data Definition Language statements at least a first time to create a corresponding new table within which are defined the same columns that are defined in the original database table, and which includes an additional column that is defined to include a User Identification, and to define a view created having the same name and column definitions as the corresponding original database table, where the view Selects only the rows in the new table in which the User Identification matches a particular user entity; and for each particular user entity, allowing access to the view created by a match of the User Identification with the particular user entity for executing Data Manipulation Language statements of the application program, including statements to insert rows, without modification of the statements of the application program other than for purposes of developing and testing functionality of the application program.

2. The method of claim 1, which further comprises, when development and testing employing Data Manipulation Language statements of the application program have reached a desired stage of completion, for each original database table, removing the Data Definition Language statements which created the corresponding new table and defined the view having the same name and column definitions as the corresponding original database table, such that the application program can access all rows of the original database table without modification of the Data Manipulation Language statements of the application program.

3. The method of claim 1, which further comprises, when development and testing employing Data Manipulation Language statements of the application program have reached a desired stage of completion, for each original database table, modifying the Data Definition Language statements which created the corresponding new table and defined the view having the same name and column definitions as the corresponding original database table by removing all reference to the User Identification such that access to the view is not limited to rows in the new Table where the User Identification matches a particular user entity, and such that the application program can access through the view all rows of the original database table without modification of the Data Manipulation Language statements of the application program.

4. The method of claim 1, wherein:

the database management system creates an authorization identification for each user entity logging on; wherein during the step of employing Data Definition Language statements at least a first time to create a corresponding new table, the additional column is defined as NOT NULL and to contain the authorization identification as a default value; and wherein the database management system, when a statement to INSERT a row accesses a view derived from a table, stores defined default values in any columns of the row which are present in the table from which the view is derived but which are missing from the view.

* * * * *